S. A. SKINNER.

OIL HOLE COVER FOR JOURNALS.

No. 10,064. Reissued Mar. 21, 1882.

WITNESSES.

James A. Wardell

N. T. Cushman.

INVENTOR.

Smith A. Skinner, by Franklin Scott, Attorney.

N. PETERS, Photo-Lithographer, Washington, D. C.

UNITED STATES PATENT OFFICE.

SMITH A. SKINNER, OF HOOSICK FALLS, NEW YORK.

OIL-HOLE COVER FOR JOURNALS.

SPECIFICATION forming part of Reissued Letters Patent No. 10,064, dated March 21, 1882.

Original No. 124,092, dated February 27, 1872. Application for reissue filed February 1, 1882.

*To all whom it may concern:*

Be it known that I, SMITH A. SKINNER, of Hoosick Falls, in the county of Rensselaer and State of New York, have invented certain Improvements in Oil-Holes and their Covers for Oiling Journals, of which the following description, in connection with the accompanying single sheet of drawings, constitutes a specification.

Figure 1:
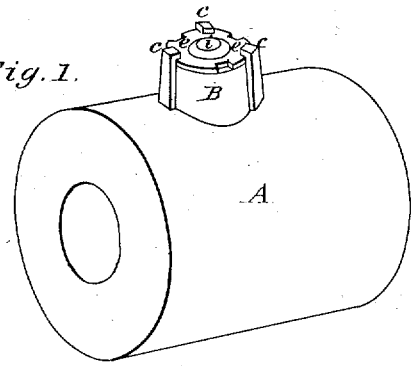
Figure 3:
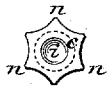
Figure 2:
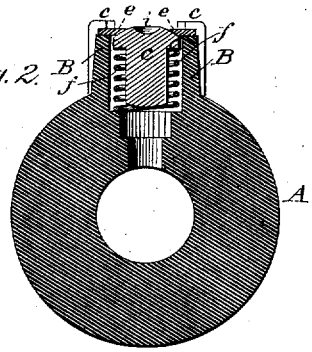

Figure 1 of the drawings represents in perspective the oil hole and cover as applied to a box or bearing so as to oil a shaft or bearing supported therein. Fig. 2 represents a section through the same. Fig. 3 represents the upper end of the plug which plays in the oil-hole and closes its top or opening.

Spring-plugs have heretofore been used in oil-holes for opening or closing the avenue through which the oil is allowed to flow from the oil-can to the shaft or journal to be oiled; but from their mode of construction there are several objections to them which I have devised means of obviating: first, they were not accessible enough; second, they would jam or stick in the oil-passage; and, third, they would gather and allow dirt, grit, seeds, &c., to pass in through the oil-passage and down to the shaft or journal bearings. Such spring-plugs, as usually made, are fitted in the top part of an oil cup or chamber provided with a threaded stem, whereby it may be screwed into a hole prepared therefor in the cap of the journal-box, and constitutes a separate and detachable fixture, the duct for the oil passing down through such stem or shank to the journal. Another variety is shown in Letters Patent No. 120,677, granted to me November 7, 1871, in which the spring-plug is inclosed in a case, shell, or thimble, which case is inserted in a socket drilled in the metal of the cap or cover of the bearing for its reception, and is securely fastened therein. Objections lie against the last two devices above named, as follows: As to the first, where the oil-cup constitutes a separate device and is attached by driving or screwing its shank or stem into a hole in the box it protrudes above the surface of the adjacent parts and forms many times an ugly and inconvenient projecting obstacle. It is more complex in its construction, consisting of more parts, and requires an extra fitting to attach it to the journal-box.

In my improved device, instead of constructing the plug-chamber in a separate piece of metal and then screwing such piece into the journal-box, I bore or construct such chamber directly in the material of the box itself, so that the walls of the cavity so made in the body of the box shall constitute the inclosing-chamber for the plug and spring, by which it is operated, thus dispensing with one piece of material and simplifying, cheapening, and improving the construction.

As to the last-above-described system, where the case or shell is employed for retaining the plug and spring, by my improved system of construction the necessity for the employment of such shell or case is obviated, the walls of the bore or chamber in which such shell is inserted serving all the purposes of the shell itself, and being much simpler and more durable.

My invention consists in a peculiarly-shaped plug, which is free to move up and down in the oil-passage without binding or getting out of position, which completely closes the opening to the oil-passage, and which, so far from collecting and allowing dust, grit, &c., to enter the oil-hole, actually sheds it or allows it to drop off, said plug having a convex instead of a concave top and yet easily forced down by the nozzle of the oil-can to allow the oil to flow in. This peculiarly-shaped plug, together with the appliance for forcing it into and normally holding it in position to close the induction-aperture of the oil-chamber, is confined and adjusted within a chamber constructed in the body or material of the journal-box itself, or of some enlargement or protuberance thereof, where the thickness of the metal is sufficient to admit of a bore or chamber of sufficient depth to receive said plug and appurtenances to render the same effective.

To enable others skilled in the art to make and use my invention, I will proceed to describe the same with reference to the drawings.

A box, bearing, or hub is represented at A, in which a shaft or journal is supported and turns. On this box, bearing, or hub is an elevated portion, B, through which and through the box A there is an opening, *g*, extending to the surface of the journal, to permit oil from the exterior to flow through. The elevated portion B has projections *c c c* connected to it, under which a centrally-perforated disk or washer, *e*, is held. Under the plate *e* a plug, C, is held, there being a coiled spring, *f*, around the shank of said plug to force it up against the under side of said plate and against an opening in the plate which the head of the plug closes. The head of the plug is made rounding or conical, and the under side of the plate *e* is countersunk, so as to allow the head of the plug to fit up closely against it and against the edges of the opening through it and make a snug joint. The highest portion of the head projects through the opening in the plate *e*, and extends somewhat above said plate, and in the apex of the head there is a countersink or recess, *i*, in or on which the nozzle of the oil-can is placed, and by pressing upon said head it sinks and opens up the oilway, through which the oil from the can flowing over said head finds its way down to the shaft or journal bearing. The head of the plug is scalloped at its edges, as seen in Fig. 3, so that the points *n* may bear against the walls of the chamber in which said plug works to prevent it from skewing, jamming, or twisting therein, while the oil is free to flow through the scalloped openings *o o*. The projections *c c c* are integral with the boss or protuberance B, and have an internal groove or notch for the reception of the edge of plate *e*, which in this case is notched to correspond with said projections *c c c*, to facilitate its insertion in place. This may be accomplished by dropping plate *e* into position, so that the notches therein shall coincide with the projections *c c c*, and then turning it around so as to bring the unbroken rim of plate *e* into the notches of the projections *c c c*. A few blows of the hammer upon the lips of the projections *c c c* then secure the plate *e* in its seat firmly. When the flange-lips at the top of projections *c c c* are pried or turned up plate *e* may be turned until its notches come opposite to the hooks or catches *c*, the spring *f* will raise up said plate, and also the plug, and disconnect them from the hub, bearing, or box, when the whole interior of the oilway is exposed and may be readily cleansed or the parts repaired and replaced in a moment's time.

Having thus described my invention, what I claim is—

The hereinbefore-described improvement in the apparatus for facilitating the lubrication of journals running in boxes, and the means connected therewith for excluding foreign substances from the oil-duct leading to the journal in such apparatus, consisting of the following arrangement of parts, viz: a chamber for the inclosure of the duct-closing devices constructed in the substance of the journal-box itself, having communication from its bottom part by an opening with the journal itself, the walls of which chamber constitute a guide for the movement of the plug and spring which operates the same to close the external port of such chamber, and provided at its upper part with provisions, substantially as shown, for retaining in position over the top of the plug a centrally-perforated plate, in combination with a plug having a conical head fitted to co-operate with and close the perforation of said plate on its under side, actuated by a spring beneath said head, both spring and plug being confined within said chamber substantially as described, and for the purposes set forth.

In testimony whereof I have hereto subscribed my name, at Hoosick Falls, New York, this 19th day of November, A. D. 1881.

SMITH A. SKINNER.

In presence of—
WM. M. ARCHIBALD,
FRANKLIN SCOTT.